United States Patent Office 3,018,670
Patented Jan. 30, 1962

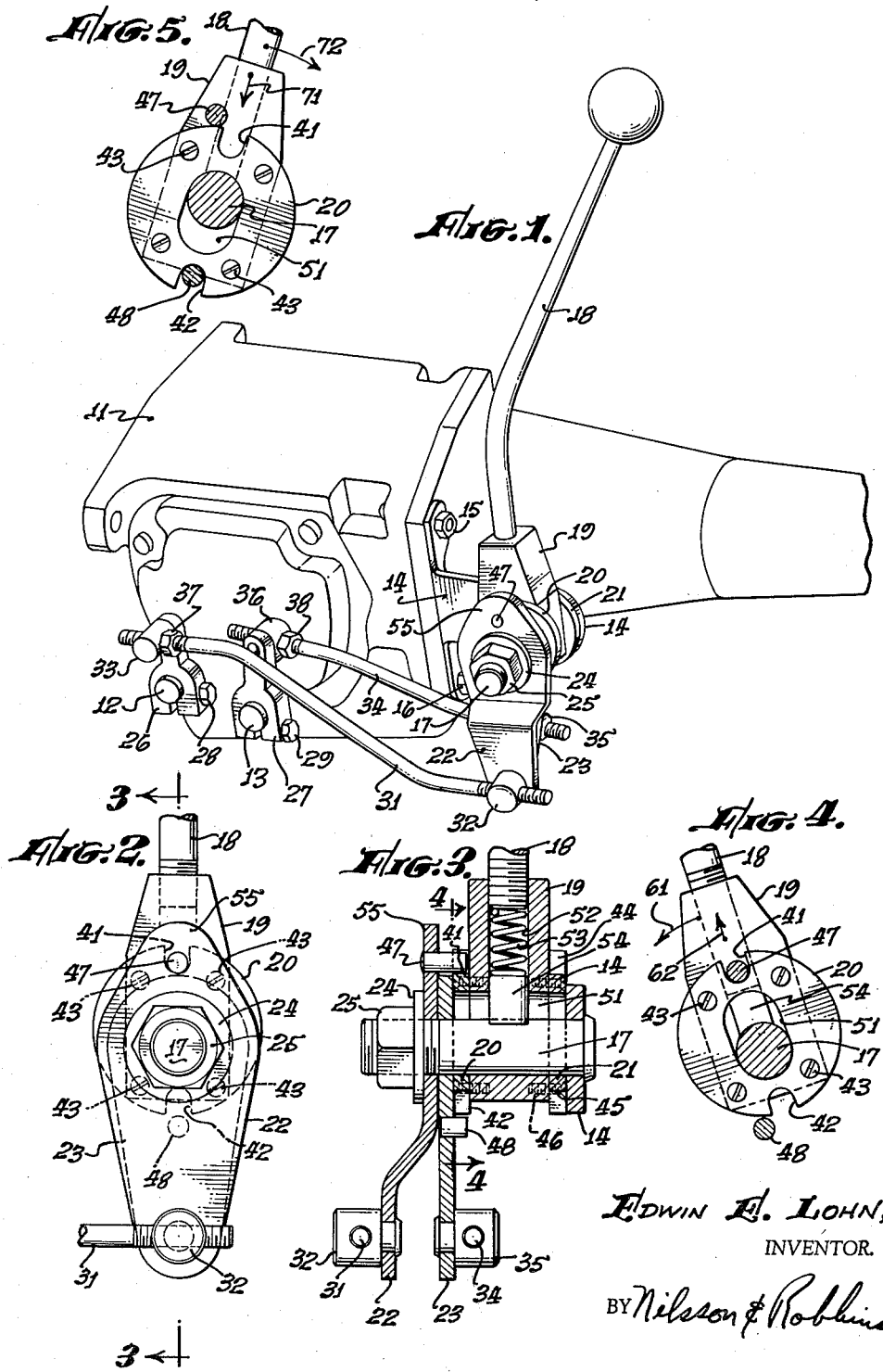

3,018,670
SHIFT MECHANISM
Edwin E. Lohn, 231 S. Peck Drive, Beverly Hills, Calif.
Filed Jan. 11, 1961, Ser. No. 82,116
12 Claims. (Cl. 74—477)

The present invention relates generally to automotive equipment and more particularly to a shift mechanism for use in combination with automobiles equipped with transmissions which are manually shifted.

Most present day automobiles which are equipped with a transmission that must be manually shifted are also equipped with a shift mechanism which must be manually manipulated through an H pattern to transfer the transmission through each of the provided speeds. Typically in transferring the transmission from first speed forward to second speed forward, commonly referred to as from low to second, the shift mechanism must be manipulated from the lower left to the upper right portion of the H by passing through the cross bar of the H. Also, typically the reverse position of the transmission is located at the upper left portion of the H. It can, therefore, be seen that when a manually shifted transmission is being rapidly changed from low to second there is an ever present danger of damaging the transmission by inadvertently placing it into the reverse position as a result of moving the shift mechanism past the cross bar of the H.

It should also become readily apparent that in addition to the inherent possibility of damaging the transmission, as above pointed out, a substantial amount of time is required to transfer the shift mechanism through the H pattern to pass from the first or low to the second speed forward. Although in normal driving conditions this time delay in transferring from low to second is not particularly critical, under racing conditions of all types it becomes exceedingly important to save as much time as is possible under all conditions.

Accordingly it is an object of the present invention to provide a shift-mechanism which eliminates the possibility of causing damage to a manually shifted transmission when transferring from one speed to another.

It is another object of the present invention to provide a shift-mechanism for a manually operated transmission which provides a faster shifting time than heretofore possible with prior art shift-mechanisms.

It is another object of the present invention to provide a shift-mechanism which may be readily and easily installed upon automotive vehicles equipped with manually shifted transmissions.

In accordance with one aspect of the present invention there is provided a pair of shifting-arms which are positioned upon a fixed pivot point. A shifting-means is disposed about the fixed pivot point in such a manner that it is movable between first and second pivot positions. The shifting-means carries means for interlocking with locking means upon each of the shift-arms depending upon the position which is occupied by the shifting-means. As the shifting-means is moved straight forward and straight back in each of its two positions about the fixed pivot point, the manually operated transmission is caused to pass through each of the four positions provided therefore by way of means interconnecting the transmission and the shift-arms.

It can, therefore, be seen that the manually manipulated transmission when equipped with the shift mechanism in accordance with the present invention is caused to transfer through each of the speeds provided therefor by merely moving the shift-arm forward and backward while it is in each of its respective positions. Such operation will hereinafter be referred to as in-line shifting.

Presently known in-line shifting mechanisms require a long "throw" to engage the transmission gears. That is, the shifting-arms must be moved through a relatively long distance to cause the transmission gears to engage. This long throw results in two major disadvantages. First, a much longer period of time is consumed in transferring from one gear to another than is desired; and second, more area of various parts are in contact thus resulting in greater wear than is desired. Since the purpose of in-line shifting is to reduce the time delay for transferring gears, it can be seen that the long throw of the prior art shift mechanisms is undesirable.

Furthermore, the presently known in-line shifting mechanisms are relatively complex and relatively critical both as to their installation and manufacture. Some of the known in-line shifting mechanisms operate on the principle of aligned positioning of slots and edges to accommodate movable pins to thereby effect the in-line shifting operation. Other known in-line shifting mechanisms operate upon the principle of accurate alignment of a movable pin with an opening therefor in order to effect the in-line shifting operation.

It can be seen, therefore, that in either case the required alignment of the various portions of the shifting mechanism results in an apparatus which is expensive to manufacture and which is difficult for the user to install and to maintain. Furthermore, the critical portions of the apparatus may become unusable as a result of wear caused by the long throw above discussed. If such occurs, the major portions of the shifting mechanism must be replaced.

Accordingly, it is another object of the present invention to provide an in-line shift mechanism for manually operated transmissions which substantially reduces the time required for transferring gears as compared to prior art in-line shift mechanisms, which is exceedingly simple, easy and inexpensive to manufacture, which is easily installed upon all standard transmissions and which does not require the replacement of parts as the result of wear.

In accordance with a more specific aspect of the present invention, there is provided an in-line shifting mechanism which includes a fixed pivot point that is attached to the housing of a standard transmission. A shifting-means is disposed upon the fixed pivot point in such a manner that it is movable between first and second positions and is spring loaded to the first position. The shifting-means carries at least one cam means having a pair of detents in the surface thereof. Disposed upon the pivot means and adjacent the cam means is a pair of shift-arms each of which carries a locking member. In the first position of the shifting-means one of the locking members engages one of the detents and while in this position movement of the shifting-means moves one of the shift-arms which in turn thereby causes the transmission to transfer from one gear to another. When the shifting-means is manually placed in its second position, the locking member on the other shift-arm engages the other detent thus causing the shift-arm to move as the shifting-means is moved and in turn the transmission to transfer from one gear to another in response to movement of the shifting-means.

Additional objects and advantages of the present invention both as to its organization and operation will become apparent from a consideration of the following description taken in conjunction with the accompanying drawing which is presented by way of example only and is not intended as a limitation upon the scope of the present invention as defined by the appended claims and in which:

FIG. 1 is a perspective view of a shift mechanism in accordance with the present invention as it appears installed upon a standard transmission which is manually shifted;

FIG. 2 is a side elevational view of a shift mechanism in accordance with the present invention;

FIG. 3 is cross-sectional view of the apparatus illustrated in FIG. 2 taken about the lines 3—3 thereof;

FIG. 4 is a side elevational view of a portion of a shift mechanism in accordance with the present invention, partly in cross-section, taken about the lines 4—4 of FIG. 3 which shows the shift mechanism in one of its operating positions; and FIG. 5 is a side elevational view of a shift mechanism in accordance with the present invention similar to FIG. 4 but showing the shift mechanism in a second one of its operating positions.

Referring now to the drawing and more particularly to FIG. 1 thereof, there is illustrated a transmission 11 which is of the standard manually shiftable type which may be utilized in automotive equipment.

Transmission control-shafts 12 and 13 extend outwardly from the transmission housing and internally thereof engage the normal actuating mechanism for transferring the transmission through the various gears and speeds provided therein. A mounting-bracket 14 is affixed by way of bolts 15 and 16 to the housing of the transmission 11. A pivot member such as a shaft 17 is affixed to the mounting-bracket 14 (more clearly seen in FIG. 3).

Mounted upon the shaft 17 is a shift means which includes a shift-lever 18 and a shift-body 19. The shift-body carries a pair of cam members 20—21, the operation of which will be described more fully below. Positioned adjacent the cam member 20 is a pair of shift-arms 22—23. The combination of the shift-body 19 and the two shift-arms 22—23 are held in place upon the shaft 17 by means of a washer 24 and a nut 25. A pair of transmission control-arms 26—27 are affixed to the transmission control-shafts 12 and 13 respectively and are held in place by bolts 28 and 29 respectively. Linkage-arm 31 is interconnected between shift-arm 22 and the transmission control-arm 26 by way of swivel-pins 32 and 33. Linkage-arm 34 is interconnected between shift-arm 23 and transmission control-arm 27 by way of swivel-pins 35 and 36. Nuts 37 and 38 which are disposed upon the ends of linkages 31 and 34 respectively are utilized to adjust the distance between the respective shift-arms and transmission control-arms.

Referring now more particularly to FIGS. 2 and 3, it can be seen that the cam 20 has a pair of spaced apart detents 41—42 and that the cam 20 is retained in place upon the shift-body 19 by means of screws 43. Preferably the spaced apart detents 41—42 in the surface of the cam 20 are disposed diametrically opposed upon the cam 20. It should, however, be expressly understood that the detents 41—42 need not be diametrically opposed but may be spaced in any desired position to cooperate with the shift-arms as more fully explained below.

First locking means such as a pin 47 is affixed to shift-arm 22 and extends inwardly therefrom toward the shift-body 19 while second locking means such as pin 48 is affixed to shift-arm 23 and also extends inwardly toward the shift-body 19. As is illustrated more clearly in FIG. 3 cam means 21 also includes a pair of spaced apart detents 44—45 and is held in place by screws 46.

It will be noted specifically from reference to FIG. 3 that the shift-body and the cams 20—21 each have an elongated opening 51 extending transversely therethrough. The shift-body also has an opening 52 extending longitudinally thereof from the top downwardly and into communication with the transverse opening 51. Disposed within the longitudinal opening 52 is a spring means such as spring 53 which abuts against the lower end portion of the shift-lever 18 and against the upper surface portion of a shoe 54 which rides upon the upper surface of the shaft 17. The spring 53 spring loads the shift means to its first position as illustrated in FIGS. 1 through 3. It should be noted with respect to the illustration in FIG. 3 that the shaft 17 and the locking pins 47 and 48 may be affixed to their respective mounting members by being press fitted into openings therein or by being welded, brazed or otherwise affixed thereto.

It should be specifically noted that the shifting mechanism in accordance with the present invention is assembled in such a manner that the shift-body 19 with the cams 20—21 affixed thereto is positioned immediately adjacent the mounting-bracket 14 and that each of the shift-arms 22—23 is then assembled in proper order on one side of the shift-body 19 and adjacent the cam 20.

It should be further noted that shift arm 22 has a portion 55 thereof extending outwardly beyond the periphery of the shift-arm 23. It is within the outwardly extending portion 55 that the locking-pin 47 is mounted. Such an arrangement is necessary to permit a clearance between the shift-arms 22—23 so that each of them may operate independently of the other as will be described more fully below. It should be further noted that the shift-lever 18 is illustrated as being threaded into the upper end portion of the shift-body 19. The shift-lever 18 may of course be welded or brazed to the shift-body 19 or alternatively may be affixed thereto by way of a pin which is driven through the shift-body 19 and the shift-lever 18. Although the shift-body 19 is illustrated as carrying the cams 20—21, it should be expressly understood that the detents may be cut directly into a shoulder which is an integral part of the shift-body 19. Therefore the shift-body should be viewed as carrying upper and lower curved surfaces having depressions in the form of detents therein.

The operation of the shift mechanism as illustrated in FIGS. 1 through 3 and as above described will be described in conjunction with FIGS. 1, 4 and 5.

FIGS. 1, 2 and 3 illustrate the shift mechanism in accordance with the present invention in the neutral position; that is, when the transmission control shafts are not actuated and the gears within the transmission are not engaged. When it is desired to engage the gears within the transmission 11, the shift-lever 18 may be moved in a straight-line direction either forward or backward. As is illustrated in FIG. 4 when it is desired to place the transmission in second gear the shift-lever 18 may be pushed forwardly in a swinging movement; that is, away from the driver and toward the front of the automobile as is illustrated by the arrow 61. In so doing the shift-arm 22 is caused to move rearwardly which in turn through the linkage-arm 31 causes the transmission control-shaft 12 to bring the proper gears within the transmission 11 into engagement. Movement of the shift-arm 22 is accomplished because the locking-pin 47 engages the detent 41 during the period time that the spring 53 loads or urges the shift means including the shift-lever 18 and the shift-body 19 outwardly away from the shaft 17 as is illustrated by the arrow 62 in FIG. 4. In this manner, the shift-arm 22 and the shift means is rigidly interconnected while the shift-arm 23 is free. The engagement of the pin 47 and the detent 41 is effected throughout the entire period of time that the shaft 17 is located at the lower portion of the opening 51 which extends transversely of the shift-body 19 and the cams 20—21 as is illustrated in FIG. 4. In such a position the shift means pivots about a first pivot point.

If it is desired to place the transmission 11 in third or high gear, the operator of the automotive vehicle need merely exert a force rearwardly or toward the driver upon the shift-lever 18 such that the shift means moves in a swinging movement in a direction opposite that illustrated by the arrow 61. By so doing the shift arm 22 is caused to move forwardly through neutral to thus place the transmission in the proper gear setting.

If it is desired to place the transmission 11 in first or low gear the operator need only place the shift mechanism in the neutral position as is illustrated in FIGS. 1 through 3 and then depress the shift means by placing a downward force upon the lever 18 thus causing the shift means including the shift-lever 18 and the shift-body 19 to move longitudinally downwardly against the force of the spring 53 so that the shaft 17 is against the upper surface of the elongate transverse opening 51 as is illustrated in FIG. 5.

As is also illustrated in FIG. 5 in this position the locking-pin 48 engages the detent 42 while the locking-pin 47 disengages the detent 41. When the shift-means is in this position the shift-arm 23 and the shift-means is rigidly interconnected while the shift-arm 22 is free. This downward motion is as illustrated by the arrow 71 in FIG. 5. By then moving the shift-lever 18 rearwardly or toward the driver in a swinging movement as is illustrated by the arrow 72 in FIG. 5, the transmission is placed in low gear.

If it becomes desirable to place the automobile in reverse gear this may be accomplished by maintaining a downward pressure as indicated by the arrow 71 of FIG. 5 upon the shift-lever 18 and by moving the shift-lever 18 forwardly in a swinging movement or opposite to the direction of the arrow 72 as illustrated in FIG. 5 past the detent 41.

If the automobile is in first or low gear and it is desirable to transfer the transmission from low to second and then to third or high gear, this may be accomplished by merely pushing forward on the shift-lever 18. As the shift-lever 18 travels through the neutral position, the force of spring 53 causes the shift-means including the shift-lever 18 and the shift-body 19 to move longitudinally upwardly as indicated by the arrow 62 in FIG. 4 thus disengaging pin 48 from detent 42 and engaging pin 47 in detent 41 and thus transferring the movement from shift-arm 23 to shift-arm 22. After the automobile has then gained the desired speed the shift-lever 18 may be returned rearwardly and shift-arm 22 causes the transmission gears to engage so that the transmission is in third or high gear.

From the foregoing description and the illustrations particularly of FIG. 4 and FIG. 5, it can readily be seen that a very short travel or throw of the shift mechanism in accordance with the present invention is sufficient to effect a complete transfer of the transmission from any position to any of the remaining gear positions which is desired. It should also be noted by having the short travel of the shifting mechanism in accordance with the present invention to effect the engagement of the various gears of the transmission that the amount of time required for shifting, even with respect to prior art in-line type shift mechanisms, is drastically reduced thus increasing the rapidity with which a race driver may transfer gears and thus reducing the amount of time required for such operations during racing.

It should also be noted that the very short travel or throw results in a minimum of contact between the locking pins and the surface of the cam. This in turn results in reducing the probability of wear a substantial amount over known devices. However, if wear should occur over a long period of use, the cam may be renewed by simply reversing the position of the shift-body from that shown in the drawing to bring the cam 21 into operational position with the locking pins. The surface of the cams are case hardened and, therefore, there is very little likelihood of wear occurring to the extent requiring replacement thereof. Under these conditions it is preferable that only one cam be used.

There has thus been disclosed an in-line shift mechanism which is exceedingly simple, inexpensive, reduces the amount of wear and operates faster than shift mechanisms heretofore known.

Although various features and concepts of the present invention have been set forth in the foregoing illustrative embodiments, the present invention is not to be limited in accordance therewith but is to be constructed in accordance with the claims set forth below.

What is claimed is:
1. An in-line shifting mechanism for use in combination with a vehicle transmission having at least three forward and one reverse drive positions and a neutral position, said mechanism comprising: a pivot member; first and second shift-arm means pivotally mounted upon said pivot member for movement about a common pivot point; shift means including a shift-lever and a shift-body mounted upon said pivot member for swinging movement about first and second pivot points; locking means rigidly interconnecting one of said first and second shift-arm means and said shift-means at all times; and means for interconnecting said shift-arm means and said transmission whereby said transmission is placed in various gear positions by swinging movement of said shift means.

2. An in-line shifting mechanism as defined in claim 1 in which said shift-body defines an elongate opening extending transversely therethrough for receiving said pivot member and for permitting said shift means to move between said first and second pivot positions.

3. An in-line shifting mechanism as defined in claim 1 in which said locking means includes first and second spaced apart detents carried by said shift-body and first and second locking pins carried by said first and second shift-arms respectively.

4. An in-line shifting mechanism as defined in claim 1 in which said first and second shift arms are disposed upon one side of said shift-body.

5. An in-line shifting mechanism as defined in claim 2 in which said shift-body defines a longitudinal opening communicating with said transverse opening and in which spring means is disposed to spring load said shift means to said first pivot position.

6. An in-line shifting mechanism for use in combination with a vehicle transmission having at least three forward and one reverse drive positions and a neutral position, said mechanism comprising: shift-means and first and second shift-arms mounted for movement about a common pivot member; said shift-means being movable on said pivot member between first and second longitudinal positions and spring loaded to said first position; cam-means having first and second detents in the surface thereof carried by said shift-means; first and second pin-means carried by said first and second shift-arms respectively and engaging said first and second detents during the time said shift-means is in said first and second positions respectively; and means for interconnecting said levers to said transmission, whereby gears within said transmission are shifted upon swinging movement of said shift-means about said pivot member.

7. An in-line shifting mechanism as defined in claim 6 in which said first and second shift-arms are positioned upon one side of said shift-means.

8. An in-line shifting mechanism as defined in claim 7 in which said first shift-arm has one portion thereof extending outwardly beyond the exterior of said second shift-arm, said outwardly extending portion carrying said first pin-means.

9. An in-line shifting mechanism as defined in claim 6 in which said cam-means is a plate having upper and lower curved surfaces and said detents are depressions in said curved surfaces and are disposed diametrically opposed on said plate.

10. An in-line shifting mechanism for use in combination with a vehicle transmission having at least three forward and one reverse drive positions and a neutral position, said mechanism comprising: a pivot member; means for affixing said pivot member to said vehicle; shift-means mounted for swinging and longitudinal movement upon said pivot member, said longitudinal movement being between first and second pivot positions; cam-means carried by said shift-means for movement therewith, said cam-means having first and second detents spaced apart upon the surface thereof; spring means loading said shift-means to said first longitudinal position;

first and second shift-arms pivotally mounted upon said pivot member; first and second pin members carried by said first and second operating levers respectively, said first pin member engaging said first detent during the time said shift-means is in said first longitudinal position and said second pin member engaging said second detent during the time said shift-means is in said second position; and means for interconnecting said shift-arms to said transmission, whereby gears within said transmission are shifted upon swinging movement of said shift-means.

11. An in-line shifting mechanism as defined in claim 10 in which said shift-means includes an interconnected shift-lever and shift-body, said shift-body carrying said cam-means, said cam-means and said shift-body defining an elongate opening extending transversely therethrough, said shift-body also defining a longitudinal opening therein communicating with said transverse opening, said spring means being disposed in said longitudinal opening.

12. An in-line shifting mechanism as defined in claim 11 in which said cam-means includes first and second cams each defining upper and lower curved surfaces having said detents disposed diametrically opposed therein, each of cams being removably affixed to one side of said shift-body.

References Cited in the file of this patent

UNITED STATES PATENTS

| | | |
|---|---|---|
| 1,302,593 | Roesch | May 6, 1919 |
| 2,078,474 | Watson | Apr. 27, 1937 |
| 2,926,762 | Edgley | Mar. 1, 1960 |
| 2,961,890 | Marshall | Nov. 29, 1960 |